(12) United States Patent
Westerling et al.

(10) Patent No.: US 6,684,697 B1
(45) Date of Patent: Feb. 3, 2004

(54) RADAR ANTENNA

(75) Inventors: Jan Westerling, Linköping (SE); Torbjörn Krig, Mariannelund (SE)

(73) Assignee: Saab Marine Electronics AB, Göteborg (SE)

( * ) Notice: Subject to any disclaimer, the term of this patent is extended or adjusted under 35 U.S.C. 154(b) by 0 days.

(21) Appl. No.: 10/308,184

(22) Filed: Dec. 3, 2002

(51) Int. Cl.$^7$ .............................. G01F 23/28; H01Q 1/42
(52) U.S. Cl. ................... 73/290 V; 73/290 R; 343/872
(58) Field of Search .................. 73/290 V, 290 R; 343/872

(56) References Cited

U.S. PATENT DOCUMENTS

| | | | | |
|---|---|---|---|---|
| 5,115,218 A | | 5/1992 | Jean ..................... | 333/252 |
| 5,406,842 A | | 4/1995 | Locke .................. | 73/290 R |
| 5,729,241 A | * | 3/1998 | Ergen et al. ........... | 343/872 |
| 5,844,529 A | * | 12/1998 | Bell et al. .............. | 343/872 |
| 6,325,391 B1 | | 12/2001 | Smith et al. ............ | 277/650 |

FOREIGN PATENT DOCUMENTS

| | | |
|---|---|---|
| DE | 19800306 | 7/1999 |
| EP | 0762089 | 8/1996 |
| JP | 63-100331 | 5/1988 |
| JP | 10-197617 | 7/1998 |

* cited by examiner

*Primary Examiner*—Hezron Williams
*Assistant Examiner*—Rodney Frank
(74) *Attorney, Agent, or Firm*—Swidler Berlin Shereff Friedman, LLP

(57) ABSTRACT

Radar antenna (1) for the transmission and reception of radar waves (4) for measuring the level of a surface of a liquid enclosed in a tank, wherein the radar antenna (1) is arranged above the surface (3a) of the liquid and substantially directed downwards towards said surface and said level determined by evaluation of the time lapsed between the transmission and reception of a signal included in said radar waves and wherein said radar antenna (1) has a front surface (1a) for transmission and reception of said radar waves, wherein said antenna (1) is a planar antenna having a sheet arranged on the surface (1a) of the antenna, wherein said sheet has a sheet surface (1b) between said antenna front surface (1a) and the surface (3a) of the liquid and said sheet surface (1b) being arranged in a predetermined angle α being greater than 0° in relation to the horizontal plane H, whereby a fluid occurring on the surface (1b) of the sheet is drained off by means of gravity.

11 Claims, 2 Drawing Sheets

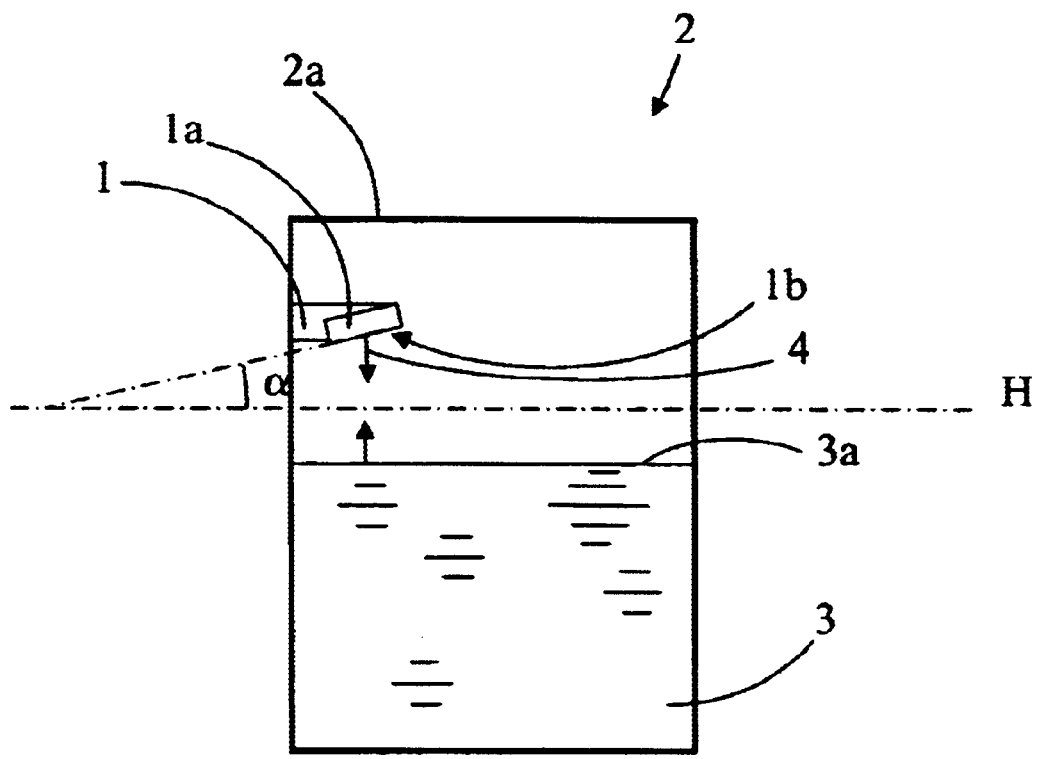

RADAR ANTENNA

TECHNICAL FIELD

Radar antenna for transmission/reception of radar waves at measuring of a level of a surface of a liquid, wherein the liquid is contained in a tank, for example a tank on vessel, at a process manufactory or at an oil refinery. More specifically, the invention is aimed at minimizing disturbances from fluids, for example water condensed on the radar antenna.

TECHNICAL BACKGROUND

When measuring a level of a surface of a liquid by means of a radar and its adherent radar antenna, wherein said liquid is contained in a tank, e. g. a tank on a vessel, at a process manufactory or at an oil refinery, different fluids may be present, whereby the fluids absorb or stop the propagation of the radar waves.

By level measuring by means of a planar antenna belonging to prior art technology the radar waves are transmitted out from the planar antenna from radar wave emitting elements, such as patches, in a right angle from the plane surface of the planar antenna.

OBJECT OF THE INVENTION

The object of the invention is to solve some of the problems mentioned above.

This is achieved by means of a device according to claim 1.

By providing a radar antenna used for transmission and reception of radar waves, when measuring a level of a liquid contained in a tank, for example a tank on a vessel or a tank at an oil refinery, with a sheet arranged in the path of the transmitted radar waves, that is between the antenna and the liquid, and by arranging a surface of said sheet facing the liquid in an angle inclined in relation to the horizontal plane, this implies that a fluid occuring on the surface, for example condensed water, is drained off from the surface by means of gravity. The sheet is preferably arranged directly on the antenna on the surface of the planar antenna.

DESCRIPTION OF THE DRAWINGS

The invention will be described closer in embodiments referring to figures as follows.

FIG. 4 shows a schematic view of a tank from the side with one side wall removed to more clearly illustrate the interior of the tank and a radar antenna arranged at one side wall of the tank.

DESCRIPTION OF EMBODIMENTS

Figure 1:
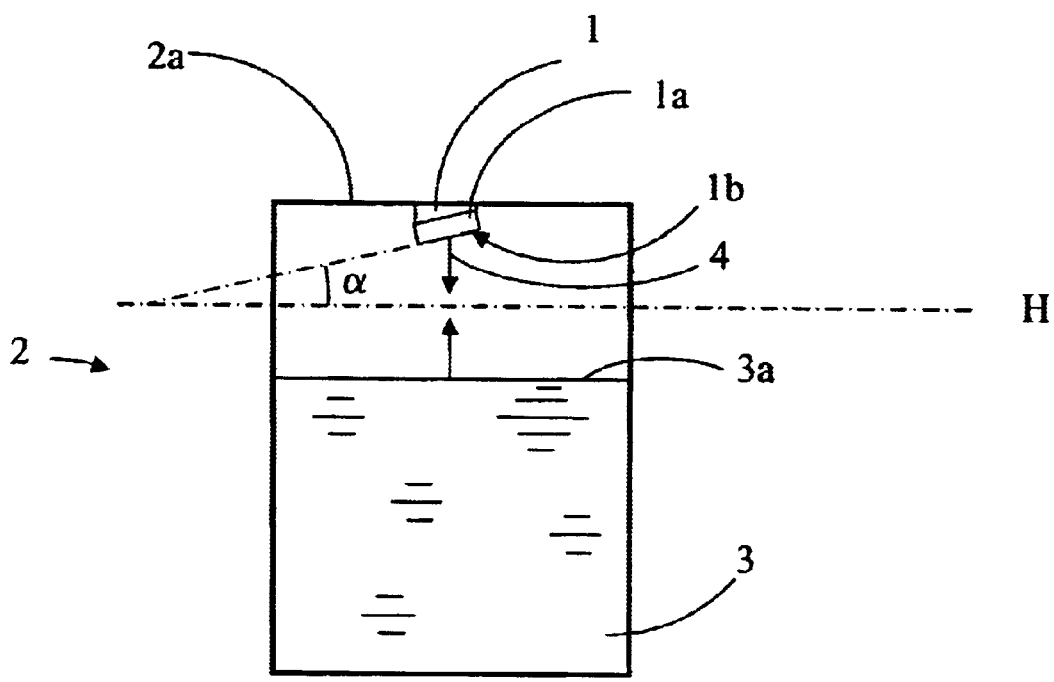
FIG. 1 shows a schematic side view of a tank with one side wall removed to make it able to more clearly show the interior of the tank and a radar antenna arranged at the roof of the tank.

A radar antenna is in the drawings denoted by 1 and a tank by 2 with the tank enclosing a liquid 3. The radar antenna 1 is, in the preferred embodiment, arranged at the roof 2a and directed downwards towards the liquid 3. When the radar antenna is transmitting radar waves 4, these waves are reflected by the liquid 3 and the level of the surface 3a of the liquid can thereby be determined according to prior art techniques. The radar antenna 1 has a front surface 1a, wherefrom the radar waves are transmitted. At the front surface 1a a substantially plane sheet is arranged. The sheet is, in a preferred embodiment, attached to and arranged on the front surface 1a of the radar antenna. The surface 1b of the sheet is arranged in an angle $\alpha$ to the horizontal plane H, so that portions of the liquid 3 or condensed liquid 3a, in general condensed water, which has been thrown up to the antenna by tank movements or condensated on the surface 1b of the sheet respectively can by means of gravity be drained off from the surface 1b of the sheet or the portion of the surface 1b of the sheet, which the radar waves substantially passes. Thus, the radar waves 4 will pass the surface 1b of the sheet in a substantially undisturbed state, for example without loss of power or shift of direction or phase. The magnitude of the angle $\alpha$ is greater than a predetermined value, whereby said value is around 10° and at least bigger than 1°±1°. In the preferred embodiment the angle is between 10° and 45° and preferably about 15°. Liquids having a high adhesion capacity, such as viscous oil require greater angle $\alpha$ than liquids having a low adhesion capacity, for example water, to let the liquid to flow along the surface 1b of the sheet. The material of which the sheet is made is also affecting the adhesion capacity of the liquid.

In an alternative embodiment, the radar antenna is arranged at the wall of the tank and thereby directed towards the surface 3a of the liquid as seen in FIG. 4.

Figure 3:
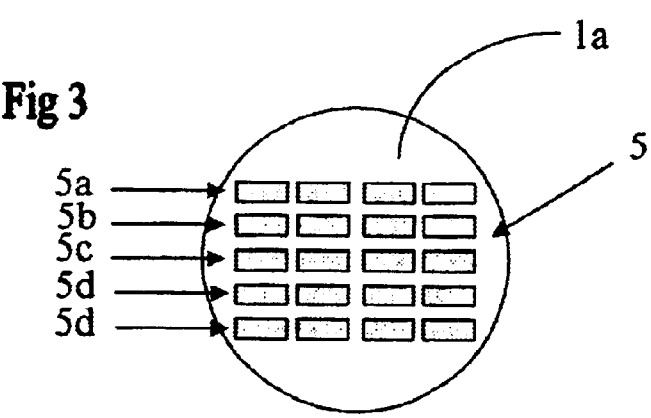
FIG. 3 shows a schematic view from below of the radar antenna according to FIG. 1, wherein the antenna includes patches arranged in a pattern.

At the radar antenna there is a number of patches, see FIG. 3, which are adapted to transmit radar waves 4. The patches 5 are arranged in a pattern, for example in rows and columns with predetermined distances. The patches are adapted to be fed with micro waves, whereby the patches of each row, for example row 5a, obtain a phase shifted feeding in relation to the other rows of patches, for example rows 5b, 5c, 5d and 5e. When substantially all rows are phase shifted, corresponding to a predetermined portion of a radar wave length from each other, the highest energy of the radar waves transmitted from the radar antenna will be directed in a direction differring from the normal to the surface 1b, see FIG. 1. Thus radar waves 4 with a high energy content can be collected to a radar wave 4 and be directed substantially straight towards ths liquid 3 in the tank although the surface 1a of the radar antenna 1 and consequently the patches 5 are arranged in an angle $\alpha$ in relation to the horizontal plane H. In an alternative embodiment the patches 5 are substituted with or combined with slots as known in prior art technology, whereby also the slots are arranged in a pattern according to the description above.

Thus, a big angle $\alpha$ gives a more rapid displacement of fluid from the plane surface 1b, but also requires a bigger phase shift between the rows 5a, 5b, 5c, 5d and 5e to make the radar wave 4 to hit the surface 3a of the liquid in a perpendicular angle.

The radar antenna 1 according to the described embodiment is a planar antenna. A planar antenna is defined as an antenna in which all of the elements, both active and parasitic, are in one plane. As stated a planar array antenna provides a large aperture and may be used for directional beam control by varying the relative phase of each element of the antenna. Preferably, the surface of the planar antenna used according to the present invention has a substantially plane surface 1a.

Figure 2:
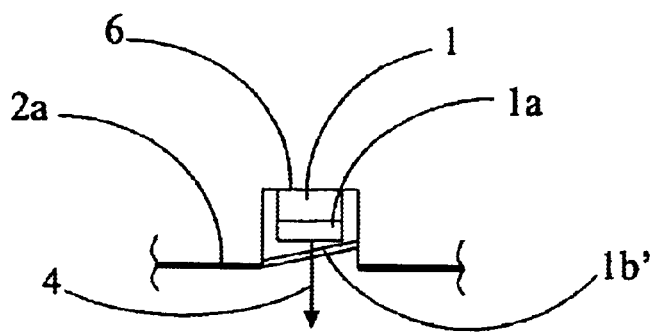
FIG. 2 shows a schematic view of an alternative embodiment of the device according to the invention.

In an alternative embodiment, see FIG. 2, the front surface 1a is arranged a distance away from the plane surface 1b. As an example the plane surface 1b is included in a sheet 1b' transparent to radar waves 4, whereby said sheet is arranged at the top of the tank 2a and thereby constitute a part of the tank 2. By this, the radar antenna 1 can, advantageously, be encapsulated in a radar housing 6 at the roof 2a of the tank, which prevents moisture and other fluid to reach the radar antenna 1 from the outside. In this embodiment also other types of radar antennas are suited, such as a horn antenna or a parabolic antenna. This embodiment according to FIG. 2 is not preferred as it is a problem to protect the space between the radar antenna and the sheet against contamination and dirt. It must be carefully sealed against the surrounding environment The invention should not be conceived as limited to the embodiments described above, but may be varied within the scope of the claims.

LIST OF REFERENCE FIGURES

1 Radar antenna
1a front
1b plane surface
1b' sheet
2 tank
2a roof of tank
3 liquid
3a surface of liquid
4 radar waves
5 patches
6 radar housing
α angle
H horizontal plane

What is claimed is:

1. Radar antenna (1) for the transmission and reception of radar waves (4) for measuring the level of a surface of a liquid enclosed in a tank, wherein the radar antenna (1) is arranged above the surface (3a) of the liquid and substantially directed downwards towards said surface and said level determined based on said radar waves being transmitted from the radar antenna (1) and reflected back from the surface (3a) of the liquid and wherein said radar antenna (1) has a front surface (1a) from which said radar waves, in operation, leave the antenna (1) and which front surface the radar waves approaches, when reflected by the liquid of the surface (3a), characterized by that said antenna (1) is a planar antenna having a sheet arranged on the front surface (1a), wherein said sheet has a sheet surface (1b) between said antenna front surface (1a) and the surface (3a) of the liquid and said sheet surface (1b) being arranged in a predetermined angle α being greater than 0° in relation to the horizontal plane H, whereby a fluid occurring on the surface (1b) of the sheet is drained off by means of gravity.

2. Radar antenna according to claim 1, wherein the value of the predetermined angle α is greater than 2°.

3. Radar antenna according to claim 1, wherein the value of the predetermined angle α is greater than 10°.

4. Radar antenna according to claim 1, wherein the value of the predetermined angle α, further, is less than 45°.

5. Radar antenna according to claim 1, wherein the surface (1b) of the sheet is substantially planar.

6. Radar antenna according to claim 1, wherein the value of the predetermined angle α, further, is less than 45° and wherein the surface (1b) of the sheet is substantially planar.

7. Radar antenna according to claim 1, wherein the sheet is a part of the roof of the tank.

8. Radar antenna according to claim 1, wherein the planar antenna (1) comprises a number of patches (5) arranged in rows, the front surface (1a) of the antenna (1) being arranged in said angle α in relation to the horizontal plane H, the sheet being a plane parallel layer on said antenna front surface for the generation of a radar lobe directed substantially perpendicular to the surface (3a) of the liquid by means of a phase shift of the radar waves for each row (5a, 5b, 5c, 5d, 5e) of the patches in a predetermined manner depending on the value of the angle α.

9. Radar antenna according to claim 8, wherein the value of the predetermined angle α is greater than 2°.

10. Radar antenna according to claim 8, wherein the value of the predetermined angle α is greater than 10°.

11. Radar antenna according to claim 8, wherein the value of the predetermined angle α, further, is less than 45°.

* * * * *